US012663282B2

(12) United States Patent (10) Patent No.: US 12,663,282 B2
Komatsu (45) Date of Patent: Jun. 23, 2026

(54) VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

(71) Applicant: TOYOTA JIDOSHA KABUSHIKI KAISHA, Toyota (JP)

(72) Inventor: Keisuke Komatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 18/526,775

(22) Filed: Dec. 1, 2023

(65) Prior Publication Data

US 2024/0210199 A1 Jun. 27, 2024

(30) Foreign Application Priority Data

Dec. 22, 2022 (JP) .................................. 2022-205636

(51) Int. Cl.
*G01C 21/36* (2006.01)
*B60Q 1/50* (2006.01)
(52) U.S. Cl.
CPC ........... *G01C 21/3647* (2013.01); *B60Q 1/50* (2013.01)
(58) Field of Classification Search
CPC ....... B60Q 1/50; G01C 21/36; G01C 21/3647
See application file for complete search history.

(56) References Cited

U.S. PATENT DOCUMENTS

| | | | |
|---|---|---|---|
| 9,845,048 B1 * | 12/2017 | Tseng ..................... | B60Q 1/525 |
| 10,759,329 B2 | 9/2020 | Morimura et al. | |
| 10,796,580 B2 * | 10/2020 | Dellock ............... | G01S 17/931 |
| 10,946,791 B2 | 3/2021 | Morimura et al. | |
| 11,260,789 B2 | 3/2022 | Morimura et al. | |
| 2001/0027363 A1 | 10/2001 | Shimazaki et al. | |
| 2002/0145662 A1 | 10/2002 | Mizusawa et al. | |

(Continued)

FOREIGN PATENT DOCUMENTS

| | | |
|---|---|---|
| DE | 102018220813 A1 | 2/2020 |
| JP | 2001-180403 A | 7/2001 |

(Continued)

*Primary Examiner* — Kito R Robinson
(74) *Attorney, Agent, or Firm* — Sughrue Mion, PLLC

(57) ABSTRACT

A vehicle driving assistance apparatus comprises an image acquisition device which takes and acquires an image of a predetermined range including a predetermined area around an own vehicle as a predetermined range image, an image projection device which projects an information providing image onto the predetermined area, and a displaying device which displays the predetermined range image and a driving assistance image, overlapping the predetermined range image. The apparatus displays the predetermined range image while decreasing a visibility of one of the driving assistance image and the information providing image in the predetermined range image when both of a displaying condition and a projecting condition become satisfied. The information providing image indicates information on the own vehicle. The driving assistance image assists a driving operation to the own vehicle by the operator.

9 Claims, 14 Drawing Sheets

(56) References Cited

U.S. PATENT DOCUMENTS

| | | | | |
|---|---|---|---|---|
| 2007/0290823 A1* | 12/2007 | Watanabe | ............ | B60Q 1/2665 |
| | | | | 348/148 |
| 2019/0206362 A1* | 7/2019 | Li | ...................... | G02B 27/0101 |
| 2020/0047807 A1 | 2/2020 | Kim | | |
| 2020/0150702 A1 | 5/2020 | Ueda | | |
| 2021/0142526 A1* | 5/2021 | Mantyjarvi | ......... | B60W 60/001 |
| 2022/0097524 A1* | 3/2022 | Choi | ........................ | B60Q 1/50 |

FOREIGN PATENT DOCUMENTS

| | | | |
|---|---|---|---|
| JP | 2002-308029 A | 10/2002 | |
| JP | 2004-182121 A | 7/2004 | |
| JP | 2014-013524 A | 1/2014 | |

* cited by examiner

VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

CROSS-REFERENCE TO RELATED APPLICATIONS

This application claims priority to Japanese patent application No. JP 2022-205636 filed on Dec. 22, 2022, the content of which is hereby incorporated by reference in its entirety.

BACKGROUND

Field

The present invention relates to a vehicle driving assistance apparatus, a vehicle driving assistance method, and a computer-readable storage medium storing a vehicle driving assistance program.

Description of the Related Art

There is known a vehicle driving assistance apparatus which assists a driving operation by a driver of an own vehicle by displaying a camera image (i.e., an image of a view behind the own vehicle taken and acquired by a camera) on a display. There is also known a vehicle driving assistance apparatus which displays the camera image showing the view behind the own vehicle on the display and displays guide lines indicating an area in which the own vehicle will move as a driving assistance image, overlapping the camera image when a shift lever is set at a rearward-moving range. There is also known a vehicle driving assistance apparatus which projects drawing images for informing persons outside the own vehicle of a moving direction of the own vehicle as an information providing image on a road surface outside the own vehicle (for example, refer to JP 2014-13524 A).

When the driving assistance image such as the guide lines is displayed, overlapping the camera image, and the information providing image such as the drawing images is shown in the camera image, the driving assistance image and the information providing image are overlapped. Thus, the driver cannot easily recognize the driving assistance image and the information providing image.

SUMMARY

An object of the present invention is to provide a vehicle driving assistance apparatus, a vehicle driving assistance method, and computer-readable storage medium storing a vehicle driving assistance program which can prevent an operator of the own vehicle including the driver of the own vehicle from having a difficulty of recognizing the driving assistance image and the information providing image.

A vehicle driving assistance apparatus according to the present invention, comprises an image acquisition device, an image projection device, a displaying device, and an electronic control unit. The image acquisition device takes and acquires an image of a predetermined range including a predetermined area around an own vehicle as a predetermined range image. The image projection device projects an information providing image onto the predetermined area.

The information providing image corresponds to an image which indicates information on the own vehicle. The displaying device displays the predetermined range image and a driving assistance image, overlapping the predetermined range image for an operator of the own vehicle. The driving assistance image corresponds to an image which assists a driving operation to the own vehicle by the operator. The electronic control unit controls activations of the image acquisition device, the image projection device, and the displaying device. The electronic control unit is configured to, when both of a displaying condition and a projecting condition become satisfied, display the predetermined range image by the displaying device while decreasing a visibility of one of the driving assistance image and the information providing image in the predetermined range image. The displaying condition corresponds to a condition for displaying the predetermined range image and the driving assistance image. The projecting condition corresponds to a condition for projecting the information providing image.

When the information providing image is shown in the predetermined range image, and the driving assistance image is displayed, overlapping the predetermined range image, the operator of the own vehicle cannot easily recognize the driving assistance image and the information providing image. With the vehicle driving assistance apparatus according to the present invention, the visibility of the driving assistance image or the information providing image in the predetermined range image is decreased. Therefore, the operator of the own vehicle can easily recognize the driving assistance image or the information providing image. Thus, the vehicle driving assistance apparatus can prevent the operator of the own vehicle from having a difficulty of recognizing the driving assistance image and the information providing image.

In the vehicle driving assistance apparatus according to an aspect of the present invention, the electronic control unit may be configured to, when both of the displaying condition and the projecting condition become satisfied, display the predetermined range image and the driving assistance image by the displaying device while decreasing the visibility of the information providing image in the predetermined range image.

With the vehicle driving assistance apparatus according to this aspect of the present invention, the visibility of the information providing image in the predetermined image is decreased. Thus, the operator of the own vehicle can easily recognize the driving assistance image.

In the vehicle driving assistance apparatus according to another aspect of the present invention, the electronic control unit may be configured to: when both of the displaying condition and the projecting condition become satisfied, (i) acquire the predetermined range image by the image acquisition device and project the information providing image by the image projection device; and (ii) display the predetermined range and the driving assistance image by the displaying device while decreasing the visibility of the information providing image in the predetermined range image by treating the predetermined range image by an image processing.

With the vehicle driving assistance apparatus according to this aspect of the present invention, the visibility of the information providing image in the predetermined image is decreased by the image processing to the predetermined range image. Thus, the operator of the own vehicle can easily recognize the driving assistance image.

In the vehicle driving assistance apparatus according to further another aspect of the present invention, the electronic control unit may be configured to: when both of the displaying condition and the projecting condition become satisfied, (i) acquire the predetermined range image by the image acquisition device and project the information providing image by the image projecting device so as to make the information providing image unshown in the predetermined range image; and (ii) display the predetermined range image and the driving assistance image by the displaying device.

With the vehicle driving assistance apparatus according to this aspect of the present invention, the information providing image is not shown in the predetermined range image displayed by the displaying device. Thus, the operator of the own vehicle can easily recognize the driving assistance image.

In the vehicle driving assistance apparatus according to further another aspect of the present invention, the electronic control unit may be configured to: when both of the displaying condition and the projecting condition become satisfied, (i) acquire the predetermined range image by the image acquisition device and project the information providing image by the image projection device; and (ii) display the predetermine range image and the driving assistance image by the displaying device while decreasing the visibility of the information providing image in the predetermined range image by treating the predetermined range image by an image processing to decrease a difference between a luminance level of the information providing image shown in the predetermined range image and a luminance level of a part of the predetermined range image surrounding the information providing image.

With the vehicle driving assistance apparatus according to this aspect of the present invention, the visibility of the information providing image in the predetermined range image is decreased by decreasing the difference in luminance between the information providing image and the image surrounding the information providing image in the predetermined range image. Thus, the operator of the own vehicle can easily recognize the driving assistance image.

In the vehicle driving assistance apparatus according to further another aspect of the present invention, the electronic control unit may be configured to: memorize the predetermined range image acquired by the image acquisition device when the electronic control unit does not project the information providing image; and when both of the displaying condition and the projecting condition become satisfied, (i) acquire the predetermined range image by the image acquisition device and project the information providing image by the image projection device, and (ii) display the predetermined range image and the driving assistance image by the displaying device while decreasing the visibility of the information providing image in the predetermined range image by replacing the information providing image in the currently-acquired predetermined range image with a part of the memorized predetermined range image corresponding to the information providing image in the currently-acquired predetermined range image.

With the vehicle driving assistance apparatus according to this aspect of the present invention, the information providing image is not shown in the predetermined range image displayed by the displaying device. Thus, the operator of the own vehicle can easily recognize the driving assistance image.

In the vehicle driving assistance apparatus according to further another aspect of the present invention, the electronic control unit may be configured to: when both of the displaying condition and the projecting condition become satisfied, (i) acquire the predetermined range image by the image acquisition device and project the information providing image by the image projection device while differentiating a point of time to acquire the predetermined range image by the image acquisition device and a point of time to project the information providing image by the image projection device; and (ii) display the predetermined range image and the driving assistance image by the displaying device.

With the vehicle driving assistance apparatus according to this aspect of the present invention, the information providing image is not shown in the predetermined range image displayed by the displaying device. Thus, the operator of the own vehicle can easily recognize the driving assistance image.

In the vehicle driving assistance apparatus according to further another aspect of the present invention, the electronic control unit may configured to: when both of the displaying condition and the projection condition become satisfied, and a lighting intensity level outside the own vehicle is equal to or lower than a predetermined lighting intensity level threshold, (i) acquire the predetermined range image by the image acquisition device and project the information providing image by the image projection device and (ii) display the predetermined range image by the displaying device without displaying the driving assistance image by the displaying device; and when both of the displaying condition and the projection condition become satisfied, and the lighting intensity level outside the own vehicle is higher than the predetermined lighting intensity level threshold, (i) acquire the predetermined range image by the image acquisition device without projecting the information providing image by the image projection device and (ii) display the predetermined range image and the driving assistance image by the displaying device.

With the vehicle driving assistance apparatus according to this aspect of the present invention, when it is dark outside the own vehicle, the information providing image is projected by the image projection device. Therefore, the information providing image is shown in the predetermined range image, and the driving assistance image is not displayed by the displaying device. Thus, the operator of the own vehicle can easily recognize the information providing image. On the other hand, when it is light outside the own vehicle, the information providing image is not projected by the image projection device, and the driving assistance image is displayed by the displaying device. Thus, the operator of the own vehicle can easily recognize the driving assistance image.

A vehicle driving assistance method according to the present invention is a method of projecting an information providing image onto a predetermined area around an own vehicle by the image projection device, taking an image of a predetermined range including the predetermined area to acquire a predetermined range image by an image acquisition device, and displaying the predetermined range image by a displaying device. The information providing image corresponding to an image which indicates information on the own vehicle. The displaying device being a device which displays the predetermined range image and a driving assistance image, overlapping the predetermined range image for an operator of the own vehicle. The driving assistance image corresponding to an image which assists a driving operation to the own vehicle by the operator. The vehicle driving assistance method according to the present invention comprises a step of displaying the predetermined range image by the displaying device while decreasing a visibility of one of the driving assistance image and the information providing image in the predetermined range image when both of a displaying condition and a projecting condition become satisfied. The displaying condition corresponds to a condition for displaying the predetermined range image and the driving assistance image. The projecting condition corresponds to a condition for projecting the information providing image.

With the vehicle driving assistance method according to the present invention, for the reasons described above, the operator of the own vehicle can be prevented from having a difficulty of recognizing the driving assistance image and the information providing image.

A computer-readable storage medium according to the present invention stores a vehicle driving assistance program which is configured to project an information providing image onto a predetermined area around an own vehicle by the image projection device, take an image of a predetermined range including the predetermined area to acquire a predetermined range image by an image acquisition device, and display the predetermined range image by a displaying device. The information providing image corresponds to an image which indicates information on the own vehicle. The displaying device being a device which displays the predetermined range image and a driving assistance image, overlapping the predetermined range image for an operator of the own vehicle. The driving assistance image corresponding to an image which assists a driving operation to the own vehicle by the operator. The vehicle driving assistance program is configured to display the predetermined range image by the displaying device while decreasing a visibility of one of the driving assistance image and the information providing image in the predetermined range image when both of a displaying condition and a projecting condition become satisfied. The displaying condition corresponds to a condition for displaying the predetermined range image and the driving assistance image. The projecting condition corresponds to a condition for projecting the information providing image.

With the vehicle driving assistance program stored in the computer-readable storage medium according to the present invention, for the reasons described above, the operator of the own vehicle can be prevented from having a difficulty of recognizing the driving assistance image and the information providing image.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
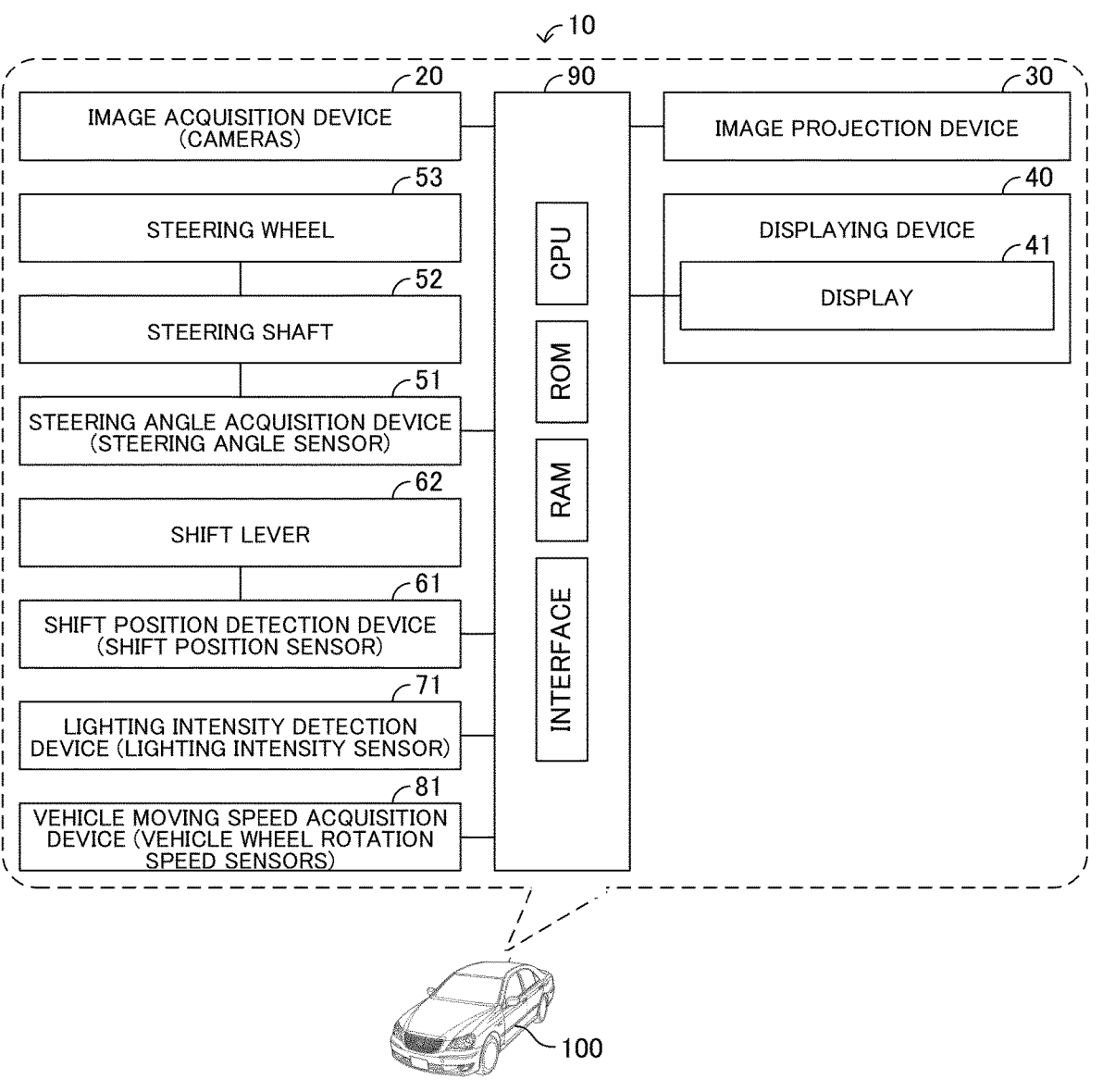
FIG. 1 is a view which shows a vehicle driving assistance apparatus according to an embodiment of the present invention.

Below, a vehicle driving assistance apparatus, a vehicle driving assistance method, and a computer-readable storage medium storing a vehicle driving assistance program according to an embodiment of the present invention, will be described with reference to the drawings. As shown in FIG. 1, the vehicle driving assistance apparatus 10 according to the embodiment of the present invention is installed on an own vehicle 100.

Hereinafter, the vehicle driving assistance apparatus 10 will be described with an example that an operator of the own vehicle 100 is a driver of the own vehicle 100 (i.e., a person who is in the own vehicle 100 and directly drives the own vehicle 100).

In this regard, the operator of the own vehicle 100 may be a remote operator of the own vehicle 100 (i.e., a person who is not in the own vehicle 100 and remotely drives the own vehicle 100). When the operator of the own vehicle 100 is the remote operator, the vehicle driving assistance apparatus 10 is installed on the own vehicle 100 and a remote operation facility, respectively. The remote operation facility is a facility which is provided outside the own vehicle 100 to remotely drive the own vehicle 100. In this case, functions realized by the vehicle driving assistance apparatus 10 as described later, are shared by the vehicle driving assistance apparatus 10 installed on the own vehicle 100 and the vehicle driving assistance apparatus 10 installed on the remote operation facility.

Further, the present invention can be applied to the vehicle driving assistance apparatus 10 which executes an automatic driving control to automatically or autonomously move the own vehicle 100.

The vehicle driving assistance apparatus 10 includes an ECU 90 or an electronic control unit as a control unit. The ECU 90 includes a micro-computer as a main component. The micro-computer includes a CPU, a ROM, a RAM, a storage medium such as a non-volatile memory, and an interface. The CPU is configured or programmed to realize various functions by executing instructions, or programs, or routines stored in the storage medium. In particular, in the present embodiment, the vehicle driving assistance apparatus 10 stores a vehicle driving assistance program to execute a driving assistance control described later in the storage medium.

It should be noted that the vehicle driving assistance apparatus 10 may be configured to update the vehicle driving assistance program by wireless communication (for example, an internet communication) with external devices.

Further, in the present embodiment, the vehicle driving assistance apparatus 10 includes one ECU. In this regard, the vehicle driving assistance apparatus 10 may include a plurality of the ECUs and be configured to cause the ECUs to share executions of various processes described below.

Furthermore, the vehicle driving assistance apparatus 10 includes an image acquisition device 20, an image projection device 30, and a displaying device 40. The ECU 90 is the control unit which controls activations of the image acquisition device 20, the image projection device 30, and the displaying device 40.

The image acquisition device 20 is a device which takes images of a predetermined range including a predetermined area AREA around the own vehicle 100 and acquires a predetermined range image IMG_R (i.e., an image of the predetermined range). The image acquisition device 20 includes, for example, cameras. In particular, in the present embodiment, the image acquisition device 20 is a device which takes images of the predetermined range including the predetermined area AREA such as a road surface or a ground behind the own vehicle 100 and acquire the predetermined range image IMG_R (i.e., the image of the predetermined range).

The image acquisition device 20 is electrically connected to the ECU 90. The ECU 90 acquires the predetermined range image IMG_R by the image acquisition device 20.

Figure 2:
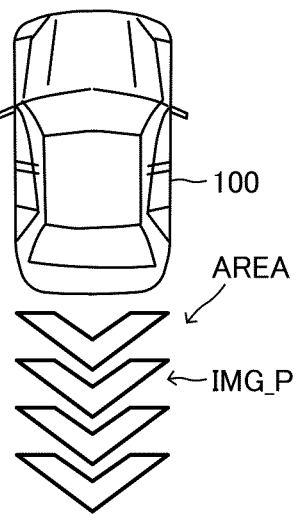
FIG. 2 is a view which shows a scene that an information providing image such as a drawing image is projected.

The image projection device 30 is a device which projects an information providing image IMG_P (i.e., an image such as a drawing image which shows information on the own vehicle 100). In particular, as shown in FIG. 2, the image projection device 30 is installed on the own vehicle 100 so as to project the information providing image IMG_P onto the predetermined area AREA such as the road surface or the ground behind the own vehicle 100. In the present embodiment, the information providing image IMG_P is an image mainly for providing people outside the own vehicle 100 with a recognition of a moving direction of the own vehicle 100.

The image projection device 30 is electrically connected to the ECU 90. The ECU 90 controls a projection of the information providing image IMG_P from the image projection device 30.

It should be noted that the image projection device 30 may be configured to project the information providing image IMG_P, using techniques such as laser or a projection mapping. In this case, the vehicle driving assistance apparatus 10 may be configured to project the information providing image IMG_P curved depending on a steering angle θ of the own vehicle 100.

The displaying device 40 is a device which displays various images. In the present embodiment, the displaying device 40 includes a display 41. The display 41 is provided in the own vehicle 100 such that the driver sitting on a driver's seat of the own vehicle 100 can see the display 41.

Figure 3:
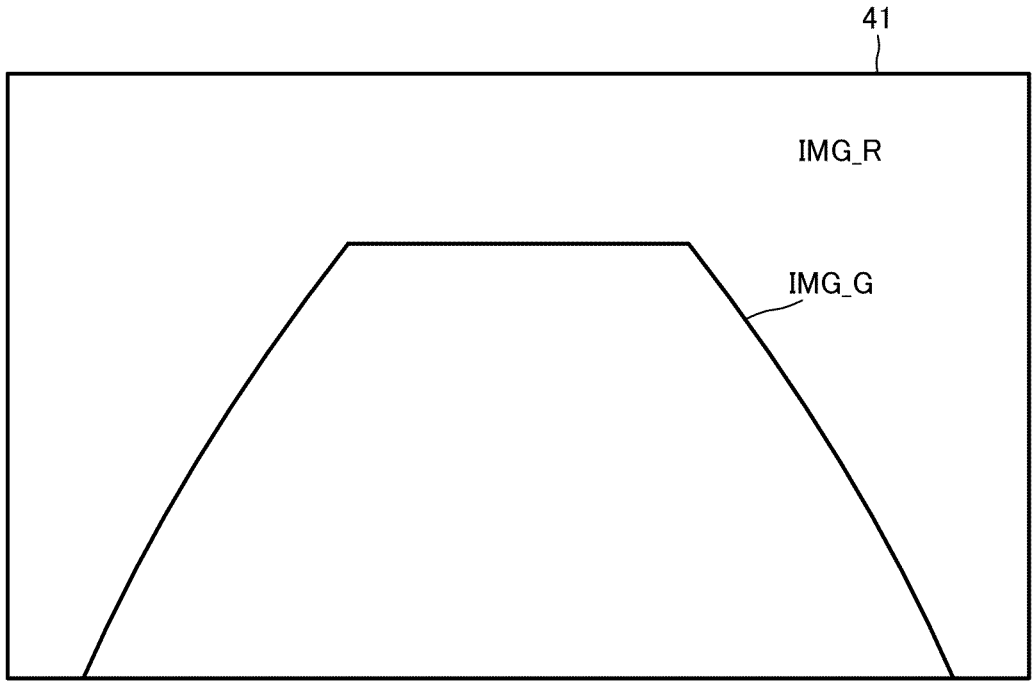
FIG. 3 is a view which shows a display displaying a driving assistance image such as guide lines, overlapping a predetermined range image.
Figure 4:
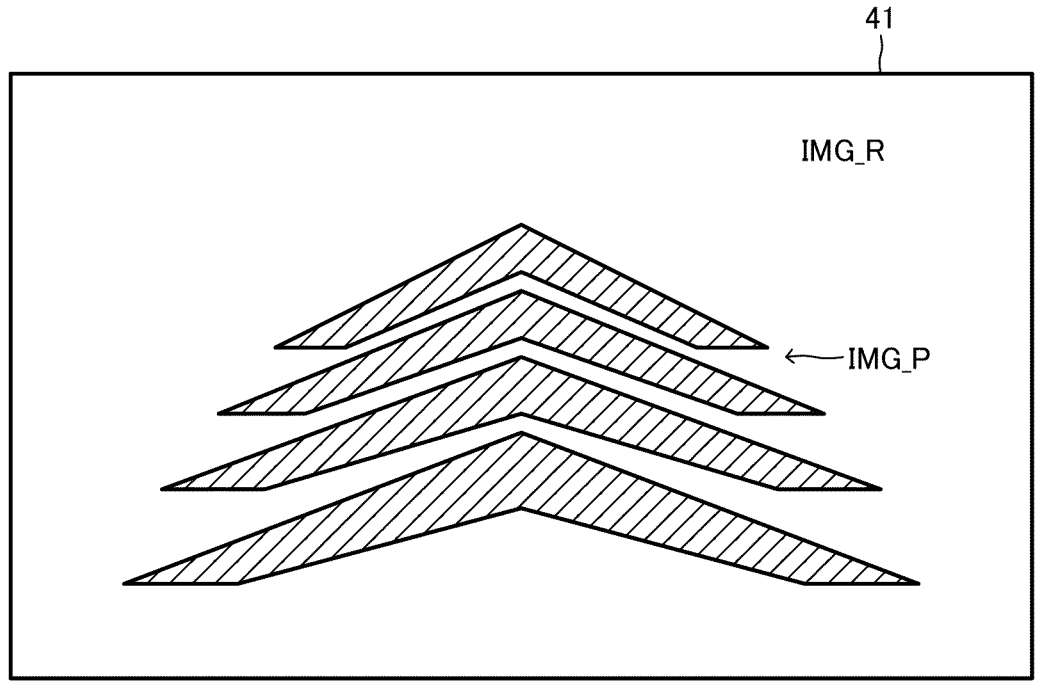
FIG. 4 is a view which shows the display displaying the predetermined range image when an information providing image such as a drawing image is projected.

When a predetermined condition becomes satisfied, the displaying device 40 displays the predetermined range image IMG_R and a driving assistance image IMG_G on the display 41 as shown in FIG. 3. The driving assistance image IMG_G corresponds to an image which assists a driving operation to the own vehicle 100 by the driver of the own vehicle 100. The driving assistance image IMG_G shown in FIG. 3 corresponds to guide lines (i.e., lines which show an area where the own vehicle 100 will move when the own vehicle 100 moves rearward). The guide lines indicate the moving direction of the own vehicle 100 and a width of the own vehicle 100. Further, the guide lines are displayed, being curved depending on the steering angle of the own vehicle 100. Therefore, the guide lines also indicate the steering angle of the own vehicle 100. The driver can move the own vehicle 100 rearward, seeing and recognizing the driving assistance image IMG_G on the display 41.

Furthermore, the vehicle driving assistance apparatus 10 includes a steering angle acquisition device 51, a shift position detection device 61, a lighting intensity acquisition device 71, and a vehicle moving speed acquisition device 81.

The steering angle acquisition device 51 is a device which acquires the steering angle of the own vehicle 100. The steering angle acquisition device 51 is, for example, a steering angle sensor. In the present embodiment, the steering angle of the own vehicle 100 corresponds to a turning angle from a base position of a steering shaft 52. The driver of the own vehicle 100 can turn the steering shaft 52 through a steering wheel 53.

The steering angle acquisition device 51 is electrically connected to the ECU 90. The ECU 90 acquires the steering angle of the own vehicle 100 as the steering angle θ by the steering angle acquisition device 51.

The shift position detection device 61 is a device which detects a set position of a shift lever 62 installed on the own vehicle 100. The shift position detection device 61 is, for example, a shift position sensor. The shift position detection device 61 is electrically connected to the ECU 90. The ECU 90 detects a set position of the shift lever 62 by the shift position detection device 61. In the present embodiment, the driver of the own vehicle 100 can set the shift lever 62 at any one of a forward-moving position (or a D range), a rearward-moving position (or an R range), a neutral position (or an N range), and a parking position (or a P range).

When the shift lever 62 is set at the forward-moving position, a driving force is applied to the own vehicle 100 so as to move the own vehicle 100 forward. Further, when the shift lever 62 is set at the rearward-moving position, the driving force is applied to the own vehicle 100 so as to move the own vehicle 100 rearward. Furthermore, when the shift lever 62 is set at the neutral position, the driving force is not applied to the own vehicle 100. Furthermore, when the shift lever 62 is set at the parking position, the driving force is not applied to the own vehicle 100, and wheels of the own vehicle 100 are locked.

The lighting intensity acquisition device 71 is a device which acquires a lighting intensity level (or a brightness) outside the own vehicle 100. The lighting intensity acquisition device 71 is, for example, a lighting intensity sensor. The lighting intensity acquisition device 71 is electrically connected to the ECU 90. The ECU 90 acquires the lighting intensity level outside the own vehicle 100 as a lighting intensity level BR by the lighting intensity acquisition device 71.

The vehicle moving speed acquisition device 81 is a device which acquires a moving speed of the own vehicle 100. The vehicle moving speed acquisition device 81 includes, for example, vehicle wheel rotation speed sensors which detect rotation speeds of the wheels of the own vehicle 100. The vehicle moving speed acquisition device 81 is electrically connected to the ECU 90. The ECU 90 acquires the moving speed of the own vehicle 100 as an own vehicle moving speed V by the vehicle moving speed acquisition device 81.

Operations of Vehicle Driving Assistance Apparatus

Next, operations of the vehicle driving assistance apparatus 10 will be described. The vehicle driving assistance apparatus 10 is configured to execute the driving assistance control by executing a routine shown in FIG. 5 with a predetermined calculation interval. Therefore, at a predetermined point of time, the vehicle driving assistance apparatus 10 starts to execute a process from a step S500 of the routine shown in FIG. 5 and proceeds with the process to a step S505. It should be noted that the driving assistance control corresponds to a control to assist the driving operation carried out by the driver of the own vehicle 100.

In the present embodiment, a displaying condition CD and a projecting condition CP are prepared.

The displaying condition CD corresponds to a condition for displaying the predetermined range image IMG_R and the driving assistance image IMG_G on the display 41 by the displaying device 40. In the present embodiment, the displaying condition CD becomes satisfied when one of a first displaying condition CD1 and a second displaying condition CD2 becomes satisfied.

The first displaying condition CD1 corresponds to a condition that the own vehicle 100 is stopped (i.e., the own vehicle moving speed V corresponds to zero), and the shift lever 62 is set at the rearward-moving position. Further, the second displaying condition CD2 corresponds to a predetermined condition which does not includes the first displaying condition CD1. In other words, the second displaying condition CD2 corresponds to a condition which does not satisfy the first displaying condition CD1 and requires displaying the predetermined range image IMG_R and the driving assistance image IMG_G on the display 41 by the displaying device 40.

Furthermore, the projecting condition CP corresponds to a condition for projecting the information providing image IMG_P onto the predetermined area AREA by the image projection device 30. In the present embodiment, the projecting condition CP becomes satisfied when one of a first projecting condition CP1 and a second projecting condition CP2 becomes satisfied.

The first projecting condition CP1 corresponds to a condition that the own vehicle 100 is stopped (i.e., the own vehicle moving speed V corresponds to zero), the shift lever 62 is set at the rearward-moving position, and at least one person exists near the own vehicle 100 (i.e., within a predetermined distance range from the own vehicle 100) and behind the own vehicle 100. Further, the second projecting condition CP2 corresponds to a predetermined condition which does not include the first projecting condition CP1. In other words, the second projecting condition CP2 corresponds to a condition which does not satisfy the first projecting condition CP1 and requires projecting the information providing image IMG_P onto the predetermined area AREA by the image projection device 30. It should be noted that the first projecting condition CP1 may not include a condition that at least one person exists within the predetermined distance range from the own vehicle 100 and behind the own vehicle 100.

In the present embodiment, the vehicle driving assistance apparatus 10 analyzes data on the predetermined range image IMG_R in order to determine whether at least one person exists within the predetermined distance range from the own vehicle 100 and behind the own vehicle 100. In this regard, when known electromagnetic sensors such as radar sensors are installed on the own vehicle 100 to irradiate electromagnetic waves to the predetermined area AREA around the own vehicle 100, the vehicle driving assistance apparatus 10 may be configured to use data acquired by the electromagnetic sensors in order to determine whether at least one person exists within the predetermined distance range from the own vehicle 100 and behind the own vehicle 100.

When the vehicle driving assistance apparatus 10 proceeds with the process to the step S505, the vehicle driving assistance apparatus 10 determines whether the displaying condition CD and the projecting condition CP are both satisfied. At this time, when the own vehicle 100 is stopped, the shift lever 62 is set at the rearward-moving position, and at least one person exists within the predetermined distance range from the own vehicle 100 and behind the own vehicle 100, the first displaying condition CD1 and the first projecting condition CP1 are both satisfied. Therefore, the displaying condition CD and the projecting condition CP are both satisfied.

Figure 6:
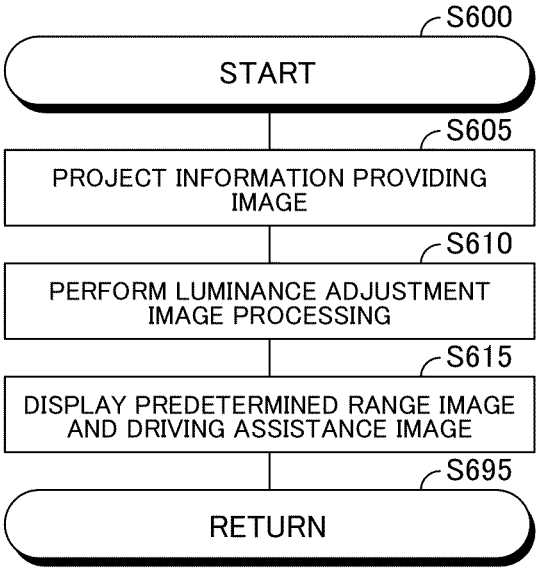
FIG. 6 is a view which shows a flowchart of a routine executed by the vehicle driving assistance apparatus according to the embodiment of the present invention.

When the vehicle driving assistance apparatus 10 determines "Yes" at the step S505, the vehicle driving assistance apparatus 10 proceeds with the process to a step S510 to execute a routine shown in FIG. 6. The routine shown in FIG. 6 will be described later.

On the other hand, when the vehicle driving assistance apparatus 10 determines "No" at the step S505, the vehicle driving assistance apparatus 10 proceeds with the process to a step S515 to determine whether the displaying condition CD is satisfied. At this time, the vehicle driving assistance apparatus 10 has determined "No" at the step S505. Therefore, the displaying condition CD is satisfied when the second displaying condition CD2 is satisfied.

When the vehicle driving assistance apparatus 10 determines "Yes" at the step S515, the vehicle driving assistance apparatus 10 proceeds with the process to a step S520 to display the predetermined range image IMG_R on the display 41 by the displaying device 40 and display the driving assistance image IMG_G on the display 41, overlapping the predetermined range image IMG_R by the displaying device 40 as shown in FIG. 3. At this time, the projecting condition CP is not satisfied. Therefore, the information providing image IMG_P is not projected by the image projection device 30. Therefore, the information providing image IMG_P is not shown in the predetermined range image IMG_R displayed on the display 41.

That is, when the displaying condition CD becomes satisfied, but the projecting condition CP is not satisfied, the vehicle driving assistance apparatus 10 does not project the information providing image IMG_P and displays the pre-determined range image IMG_R and the driving assistance image IMG_G by the displaying device 40 as shown in FIG. 3. At this time, the information providing image IMG_P is not shown in the predetermined range image IMG_R displayed by the displaying device 40.

Then, the vehicle driving assistance apparatus 10 proceeds with the process to a step S595 to terminate executing this routine once.

On the other hand, when the vehicle driving assistance apparatus 10 determines "No" at the step S515, the vehicle driving assistance apparatus 10 proceeds with the process to a step S525 to determine whether the projecting condition CP is satisfied. At this time, the vehicle driving assistance apparatus 10 has determined "No" at the step S505. There-fore, the projecting condition CP is satisfied when the second projecting condition CP2 is satisfied.

When the vehicle driving assistance apparatus 10 deter-mines "Yes" at the step S525, the vehicle driving assistance apparatus 10 proceeds with the process to a step S530 to project the information providing image IMG_P by the image projection device 30. That is, when the projecting condition CP becomes satisfied, but the displaying condition CD is not satisfied, the vehicle driving assistance apparatus 10 projects the information providing image IMG_P by the image projection device 30. At this time, neither the prede-termined range image IMG_R nor the driving assistance image IMG_G are displayed by the displaying device 40.

Then, the vehicle driving assistance apparatus 10 pro-ceeds with the process to the step S595 to terminate execut-ing this routine once.

On the other hand, when the vehicle driving assistance apparatus 10 determines "No" at the step S525, the vehicle driving assistance apparatus 10 proceeds with the process to a step S535. When the vehicle driving assistance apparatus 10 proceeds with the process to the step S535 and displays the predetermined range image IMG_R and the driving assistance image IMG_G by the displaying device 40, the vehicle driving assistance apparatus 10 terminates display-ing the predetermined range image IMG_R and the driving assistance image IMG_G by the displaying device 40. Further, when the vehicle driving assistance apparatus 10 proceeds with the process to the step S535 and projects the information providing image IMG_P by the image projec-tion device 30, the vehicle driving assistance apparatus 10 terminates projecting the information providing image IMG_P by the image projection device 30.

Then, the vehicle driving assistance apparatus 10 pro-ceeds with the process to the step S595 to terminate execut-ing this routine once.

Figure 7:
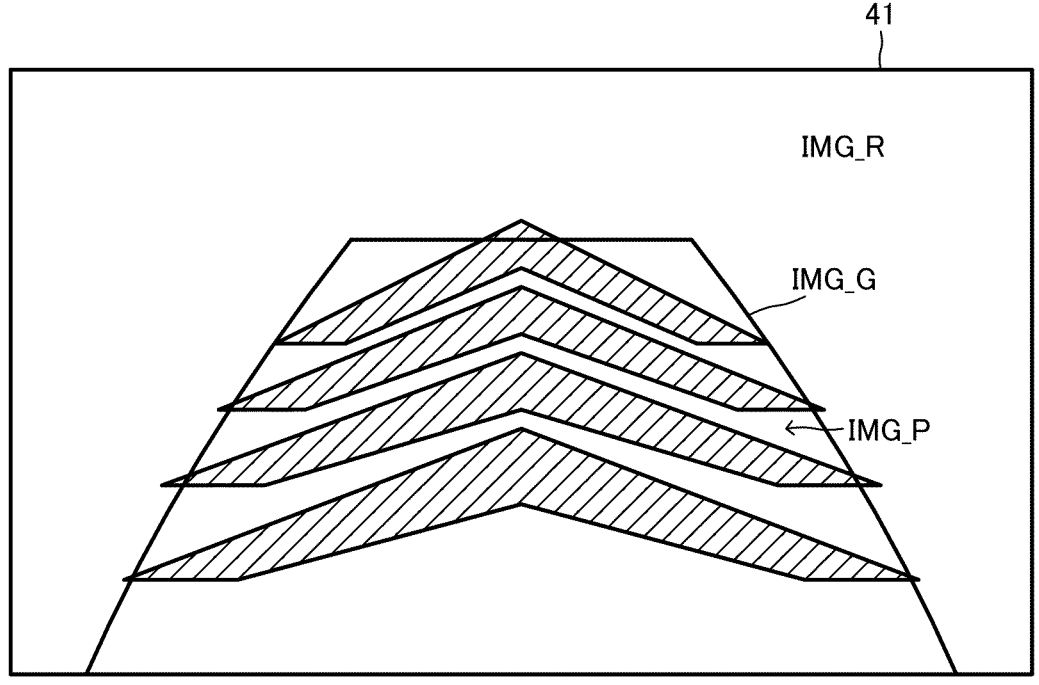
FIG. 7 is a view which shows the display displaying the driving assistance image such as the guide lines, overlapping the predetermined range image when the information providing image such as the drawing image is projected.

When the information providing image IMG_P is shown in the predetermined range image IMG_R, and the driving assistance image IMG_G is displayed on the display 41, overlapping the predetermined range image IMG_R, the driving assistance image IMG_G and the information pro-viding image IMG_P are displayed close to each other or overlapping each other as shown in FIG. 7. In this case, the driver of the own vehicle 100 has a difficulty of recognizing the driving assistance image IMG_G.

Accordingly, when both of the displaying condition CD and the projecting condition CP become satisfied, that is, when the vehicle driving assistance apparatus 10 determines "Yes" at the step S505, the vehicle driving assistance appa-ratus 10 proceeds with the process to the step S510 to execute the routine shown in FIG. 6.

When the vehicle driving assistance apparatus 10 pro-ceeds with the process to the step S510, the vehicle driving assistance apparatus 10 starts to execute a process from a step S600 of the routine shown in FIG. 6 and proceeds with the process to a step S605 to project the information pro-viding image IMG_P by the image projection device 30. Thereby, the information providing image IMG_P is pro-jected onto the predetermined area AREA (i.e., the road surface or the ground behind the own vehicle 100).

Figure 8:
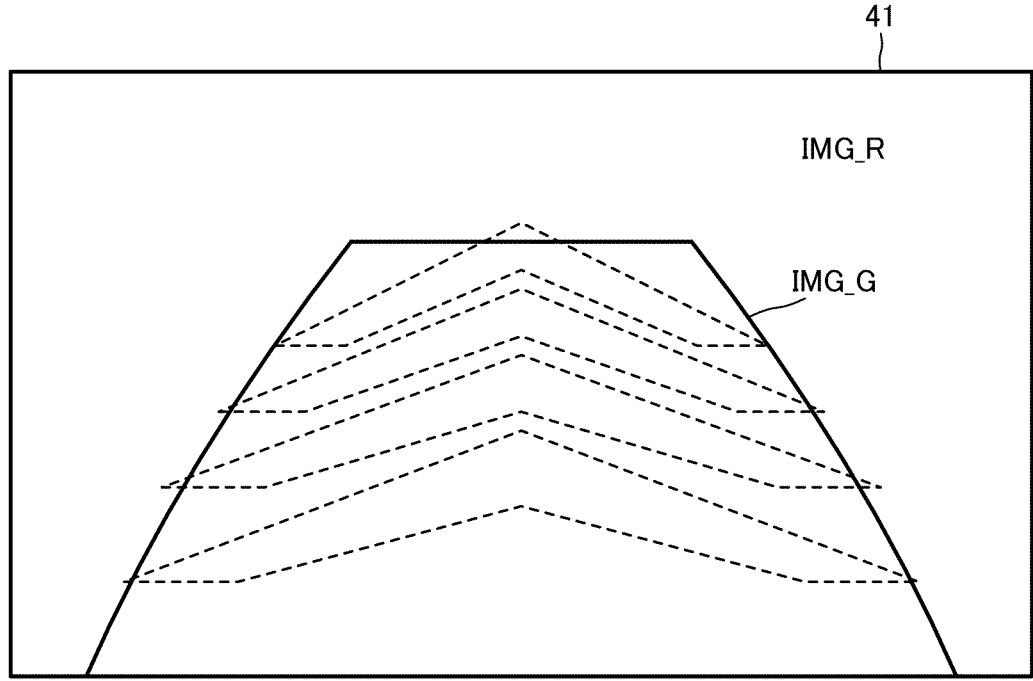
FIG. 8 is a view which shows the predetermined range image treated by a luminance adjustment image processing.

Next, the vehicle driving assistance apparatus 10 proceeds with the process to a step S610 to treat the predetermined range image IMG_R by a luminance adjustment image processing. In the present embodiment, the luminance adjustment image processing corresponds to a processing to decrease an information providing image luminance level LUM_P so as to make a luminance level difference ΔLUM zero as shown in FIG. 8. The information providing image luminance level LUM_P corresponds to a luminance level of the information providing image IMG_P shown in the predetermined range image IMG_R. The luminance level difference ΔLUM corresponds to a difference between the information providing image luminance level LUM_P and a surrounding luminance level LUM_S. The surrounding luminance level LUM_S corresponds to a luminance level of a part of the predetermined range image IMG_R surround-ing the information providing image IMG_P. Thereby, the vehicle driving assistance apparatus 10 decrease a visibility of the information providing image IMG_P in the predeter-mined range image IMG_R. In the present embodiment, the visibility of the image represents a degree that the driver of the own vehicle 100 can recognize the image. A recogniz-ability of the image by the driver increases as the visibility of the image increases.

It should be noted that the vehicle driving assistance apparatus 10 may be configured to project the information providing image IMG_P onto the predetermined area AREA, for example, by visible light having a predetermined frequency or the modulated visible light such as the polar-ized visible light. Thereby, the vehicle driving assistance apparatus 10 can easily determine positions of the informa-tion providing image IMG_P shown in the predetermined range image IMG_R by analyzing the data on the predeter-mined range image IMG_R.

Next, the vehicle driving assistance apparatus 10 proceeds with the process to a step S615 to (i) display the predeter-mined range image IMG_R treated by the luminance adjust-ment image processing on the display 41 by the displaying device 40 and (ii) display the driving assistance image IMG_G with a normal luminance level, overlapping the predetermined range image IMG_R on the display 41 by the displaying device 40. Thereby, the predetermined range image IMG_R is displayed on the display 41, and the driving assistance image IMG_G is displayed, overlapping the pre-determined range image IMG_R on the display 41.

It should be noted that the normal luminance level of the driving assistance image IMG_G corresponds to the lumi-nance level of the driving assistance image IMG_G dis-played by the displaying device 40 when the displaying condition CD becomes satisfied, but the projecting condition CP is not satisfied. In the present embodiment, the normal luminance level of the driving assistance image IMG_G corresponds to the luminance level of the driving assistance image IMG_G displayed by the displaying device 40 at the step S520 of the routine shown in FIG. 5.

Then, the vehicle driving assistance apparatus 10 pro-ceeds with the process to a step S695 to terminate executing this routine once.

As described above, in the embodiment of the present invention, the vehicle driving assistance apparatus 10 is configured to, when both of the displaying condition CD and the projecting condition CP become satisfied, display the predetermined range image IMG_R and the driving assistance image IMG_G by the displaying device 40 while decreasing the visibility of the information providing image IMG_P in the predetermined range image IMG_R.

Thereby, the visibility of the information providing image IMG_P in the predetermined range image IMG_R is decreased when the driving assistance image IMG_G is displayed on the display 41. Thus, the vehicle driving assistance apparatus 10 can prevent the driver from having a difficulty of recognizing the driving assistance image IMG_G.

It should be noted that in the embodiment of the present invention, the luminance adjustment image processing corresponds a processing to adjust the information providing image luminance level LUM_P so as to make the luminance level difference ΔLUM zero. In this regard, in the present invention, the luminance adjustment image processing may not correspond to a processing to make the luminance level difference ΔLUIM zero. The luminance adjustment image processing may correspond to a processing to adjust the information providing image luminance level LUM_P to make the luminance level difference ΔLUIM lower than the original luminance level difference ΔLUIM (i.e., the luminance level difference ΔLUIM before the information providing image IMG_P is treated by the luminance adjustment image processing).

Therefore, in the present invention, the vehicle driving assistance apparatus 10 may be configured to, when both of the displaying condition CD and the projecting condition CP become satisfied, (i) acquire the predetermined range image IMG_R by the image acquisition device 20 and project the information providing image IMG_P by the image projection device 30, and (ii) display the predetermined range image IMG_R and the driving assistance image IMG_G by the displaying device 40 while decreasing the visibility of the information providing image IMG_P in the predetermined range image IMG_R by treating the predetermined range image IMG_R by the image processing to decrease the luminance level difference ΔLUM (the difference between (a) the information providing image luminance level LUM_P, i.e., the luminance level of the information providing image IMG_P shown in the predetermined range image IMG_R and (b) the surrounding luminance level LUM_S, i.e., the luminance level of the part of the predetermined range image IMG_R surrounding the information providing image IMG_P). It should be noted that in this case, a process to decrease the luminance level difference ΔLUM includes a process to make the luminance level difference ΔLUM zero.

It should be noted that the present invention is not limited to the aforementioned embodiments, and various modifications can be employed within the scope of the invention.

First Modified Example

Figure 5:
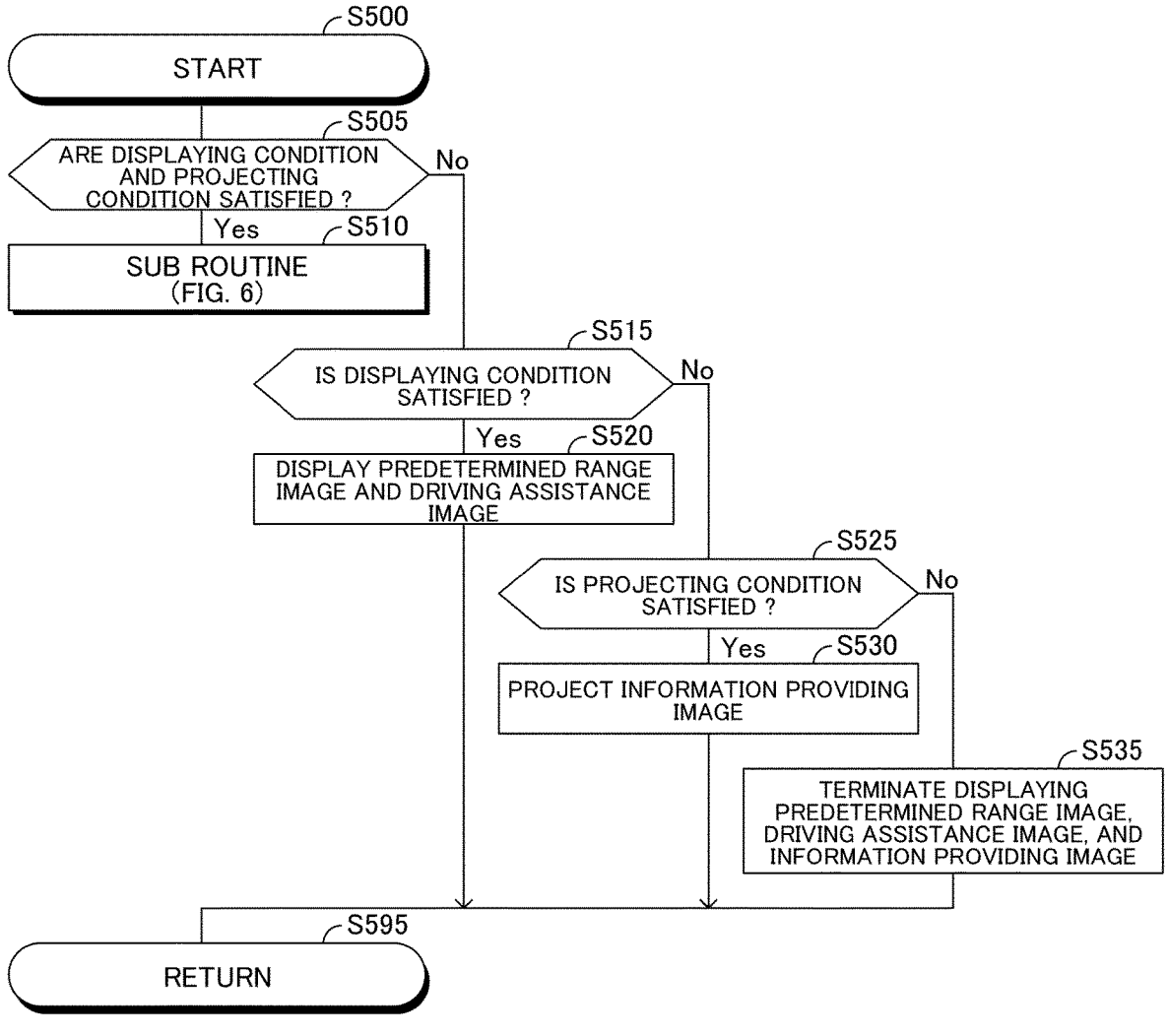
FIG. 5 is a view which shows a flowchart of a routine executed by the vehicle driving assistance apparatus according to the embodiment of the present invention.
Figure 9:
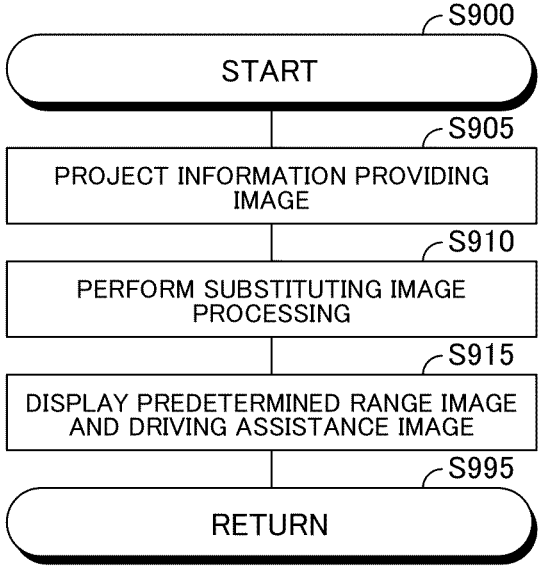
FIG. 9 is a view which shows a flowchart of a routine executed by the vehicle driving assistance apparatus according to a first modified example of the embodiment of the present invention.

For example, as a first modified example of the embodiment of the present invention, the vehicle driving assistance apparatus 10 may be configured to execute a routine shown in FIG. 9 in place of the routine shown in FIG. 6 when the vehicle driving assistance apparatus 10 proceeds with the process to the step S510 of the routine shown in FIG. 5.

In this case, when the vehicle driving assistance apparatus 10 proceeds with the process to the step S510 of the routine shown in FIG. 5, the vehicle driving assistance apparatus 10 starts to execute a process from a step S900 of the routine shown in FIG. 9 and proceeds with the process to a step S905 to project the information providing image IMG_P by the image projection device 30 similar to the step S605.

Figure 10:
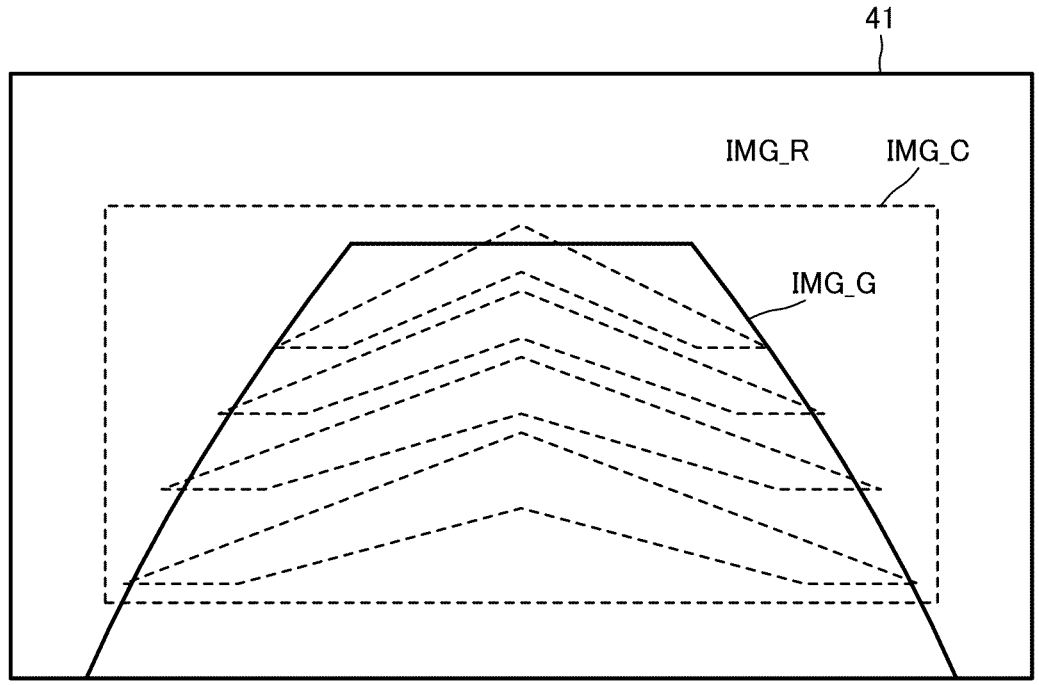
FIG. 10 is a view which shows the predetermined range image treated by a substituting image processing.

Next, the vehicle driving assistance apparatus 10 proceeds with the process to a step S910 to perform a substituting image processing. The substituting image processing corresponds to a processing to (i) extract an image IMG_C which covers the information providing image IMG_P shown in the currently-acquired predetermined range image IMG_R from the predetermined range image IMG_R acquired and memorized immediately before the information providing image IMG_P is projected at the step S905, and (ii) substitute or replace a part covering the information providing image IMG_P shown in the currently-acquired predetermined range image IMG_R with the extracted image IMG_C as shown in FIG. 10.

At this time, the vehicle driving assistance apparatus 10 can employ any of a first substituting image processing to a third substituting image processing as the substituting image processing.

The first substituting image processing corresponds to a processing to (i) extract the image IMG_C which corresponds to and surrounds the information providing image IMG_P shown in the currently-acquired predetermined range image IMG_R from the predetermined range image IMG_R acquired and memorized immediately before the information providing image IMG_P is projected at the step S905, and (ii) substitute the information providing image IMG_P shown in the currently-acquired predetermined range image IMG_R and a part of the currently-acquired predetermined range image IMG_R surrounding the information providing image IMG_P with the extracted image IMG_C. In other words, the first substituting image processing corresponds to a processing to replace the information providing image IMG_P shown in the currently-acquired predetermined range image IMG_R and the part of the currently-acquired predetermined range image IMG_R surrounding the information providing image IMG_P with the image IMG_C extracted as described above.

The second substituting image processing corresponds to a processing to (i) extract the image IMG_C which corresponds to the information providing image IMG_P shown in the currently-acquired predetermined range image IMG_R from the predetermined range image IMG_R acquired and memorized immediately before the information providing image IMG_P is projected at the step S905, and (ii) substitute the information providing image IMG_P shown in the currently-acquired predetermined range image IMG_R with the extracted image IMG_C. In other words, the second substituting image processing corresponds to a processing to replace the information providing image IMG_P shown in the currently-acquired predetermined range image IMG_R with the image IMG_C extracted as described above.

The third substituting image processing corresponds to a processing to substitute the currently-acquired predetermined range image IMG_R with the predetermined range image IMG_R acquired and memorized immediately before the information providing image IMG_P is projected at the step S905. In other words, the third substituting image processing corresponds to a processing to replace the currently-acquired predetermined range image IMG_R with the predetermined range image IMG_R acquired and memorized immediately before the information providing image IMG_P is projected at the step S905.

Next, the vehicle driving assistance apparatus 10 proceeds with the process to a step S915 to display the predetermined range image IMG_R treated by the substituting image processing on the display 41 by the displaying device 40 and display the driving assistance image IMG_G with the normal luminance level, overlapping the predetermined range image IMG_R on the display 41 by the displaying device 40.

Then, the vehicle driving assistance apparatus 10 proceeds with the process to a step S995 to terminate executing this routine once.

As described above, also in the first modified embodiment, the vehicle driving assistance apparatus 10 is configured to display the predetermined range image IMG_R and the driving assistance image IMG_G by the displaying device 40 while decreasing the visibility of the information providing image IMG_P in the predetermined range image IMG_R when both of the displaying condition CD and the projecting condition CP become satisfied. Thereby, the information providing image IMG_P is not displayed on the display 41. Thus, the vehicle driving assistance apparatus 10 can prevent the driver from having a difficulty of recognizing the driving assistance image IMG_G.

It should be noted that the vehicle driving assistance apparatus 10 according to the first modified example uses the predetermined range image IMG_R acquired and memorized immediately before the information providing image IMG_P is projected for the substituting image processing. In this regard, in the present invention, the predetermined range image IMG_R used for the substituting image process is not limited to the predetermined range image IMG_R acquired and memorized immediately before the information providing image IMG_P is projected. The predetermined range image IMG_R used for the substituting image processing may be the predetermined range image IMG_R acquired and memorized when the information providing image IMG_P is not projected.

Figure 11:
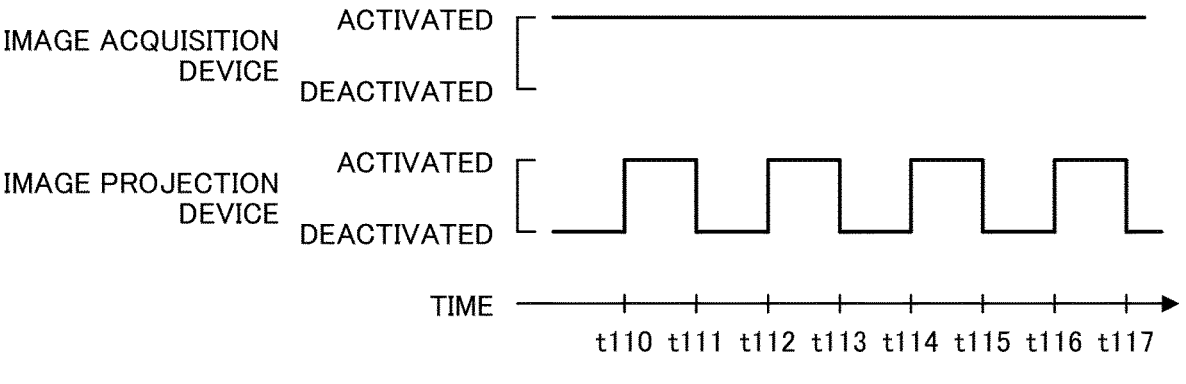
FIG. 11 is a view which shows a time chart showing activations of an image acquisition device and an image projection device when the vehicle driving assistance apparatus according to the first modified example of the embodiment of the present invention performs the substituting image processing.

For example, as shown in FIG. 11, the vehicle driving assistance apparatus 10 may be configured to (i) continuously activate the image acquisition device 20 to continuously acquire the predetermined range image IMG_R, (ii) switch an activation of the image projection device 30 to project the information providing image IMG_P and a deactivation of the image projection device 30 to stop projecting the information providing image IMG_P with a predetermined cycle, and (iii) use the predetermined range image IMG_R acquired and memorized while the projection of the information providing image IMG_P is stopped for the substituting image processing.

In this case, the vehicle driving assistance apparatus 10 uses the predetermined range image IMG_R acquired and memorized from a point of time t111 to a point of time t112 for the substituting image processing which treats the predetermined range image IMG_R acquired from the point of time t112 to a point of time t113. Further, the vehicle driving assistance apparatus 10 uses the predetermined range image IMG_R acquired and memorized from the point of time t113 to a point of time t114 for the substituting image processing which treats the predetermined range image IMG_R acquired from the point of time t114 to a point of time t115. Furthermore, the vehicle driving assistance apparatus 10 uses the predetermined range image IMG_R acquired and memorized from the point of time t115 to a point of time t116 for the substituting image processing which treats the predetermined range image IMG_R acquired from the point of time t116 to a point of time t117.

Therefore, in the present invention, the vehicle driving assistance apparatus 10 may be configured to (i) memorize the predetermined range image IMG_R acquired by the image acquisition device 20 when the vehicle driving assistance apparatus 10 does not project the information providing image IMG_P, (ii) acquire the predetermined range image IMG_R by the image acquisition device 20 and project the information providing image IMG_P by the image projection device 30 when both of the displaying condition CD and the projecting condition CP become satisfied, and (iii) display the predetermined range image IMG_R and the driving assistance image IMG_G by the displaying device 40 while decreasing the visibility of the information providing image IMG_P in the predetermined range image IMG_R by substituting the information providing image IMG_P in the currently-acquired predetermined range image IMG_R with a part of the memorized image (i.e., the memorized predetermined range image IMG_R) which corresponds to the information providing image IMG_P in the currently-acquired predetermined range image IMG_R.

Further, in the embodiment of the present invention and the first modified example thereof, the vehicle driving assistance apparatus 10 decreases the visibility of the information providing image IMG_P in the predetermined range image IMG_R by treating the predetermined range image IMG_R by the image processing. In this regard, in the present invention, the image processing to decrease the visibility of the information providing image IMG_P in the predetermined range image IMG_R is not limited to the image processing according to the embodiment of the present invention and the first modified example thereof. In the present invention, the image processing to decrease the visibility of the information providing image IMG_P in the predetermined range image IMG_R may be any other image processing.

Therefore, in the present invention, the vehicle driving assistance apparatus 10 may be configured to, when both of the displaying condition CD and the projecting condition CP become satisfied, (i) acquire the predetermined range image IMG_R by the image acquisition device 20 and project the information providing image IMG_P by the image projection device 30, and (ii) display the predetermined range image IMG_R and the driving assistance image IMG_G by the displaying device 40 while decreasing the visibility of the information providing image IMG_P in the predetermined range image IMG_R by treating the predetermined range image IMG_R by the image processing.

Second Modified Example

Figure 12:
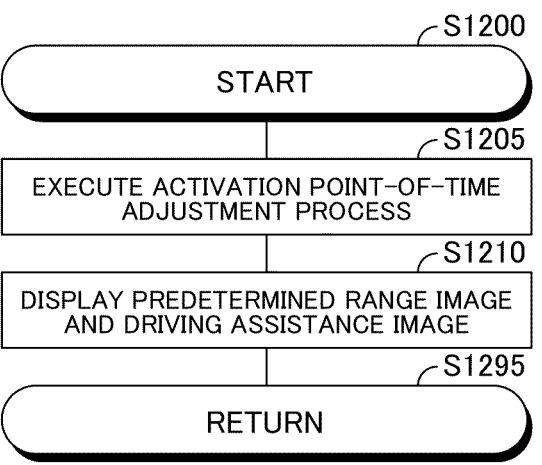
FIG. 12 is a view which shows a flowchart of a routine executed by the vehicle driving assistance apparatus according to a second modified example of the embodiment of the present invention.

Further, in a second modified example of the embodiment of the present invention, the vehicle driving assistance apparatus 10 may be configured to execute a routine shown in FIG. 12 in place of the routine shown in FIG. 6 when the vehicle driving assistance apparatus 10 proceeds with the process to the step S510 of the routine shown in FIG. 5.

In this case, when the vehicle driving assistance apparatus 10 proceeds with the process to the step S510 of the routine shown in FIG. 5, the vehicle driving assistance apparatus 10 starts to execute a process from a step S1200 of the routine shown in FIG. 12 and proceeds with the process to a step S1205 to execute an activation point-of-time adjustment process. The activation point-of-time adjustment process corresponds to a process to acquire the predetermined range image IMG_R by the image acquisition device 20 and project the information providing image IMG_P by the image projection device 30 while differentiating a point of time to acquire the predetermined range image IMG_R by the image acquisition device 20 and a point of time to project the information providing image IMG_P by the image projection device 30 to each other.

Figure 13:
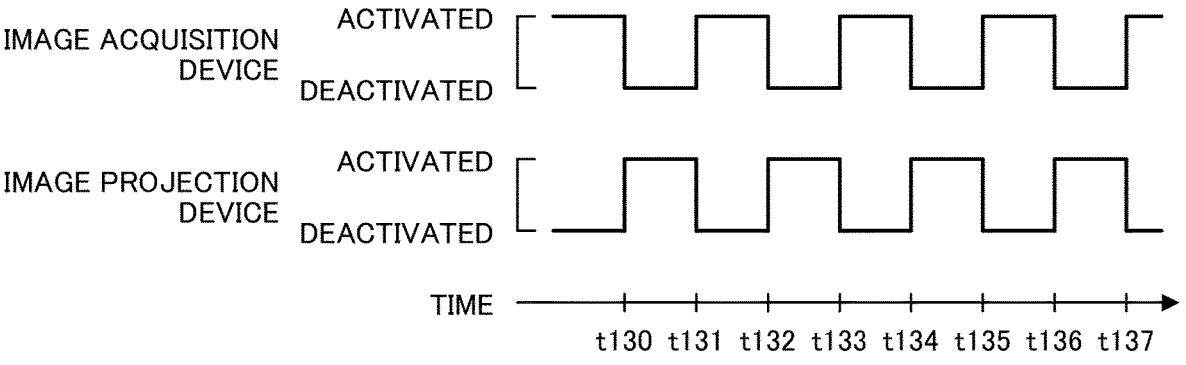
FIG. 13 is a view which shows a time chart showing the activation of the image acquisition device to acquire the predetermined range image and the activation of the image projection device to project the information providing image by the vehicle driving assistance apparatus according to the second modified example of the embodiment of the present invention.

In an example shown in FIG. 13, the image acquisition device 20 is deactivated, and the image projection device 30 is activated to project the information providing image IMG_P from a point of time t130 to a point of time t131. Then, the image acquisition device 20 is activated to acquire the predetermined range image IMG_R, and the image projection device 30 is deactivated from the point of time t131 to a point of time t132. Then, the image acquisition device 20 is deactivated, and the image projection device 30 is activated to project the information providing image IMG_P from the point of time t132 to a point of time t133. Then, the image acquisition device 20 is activated to acquire the predetermined range image IMG_R, and the image projection device 30 is deactivated from the point of time t133 to a point of time t134. Then, the image acquisition device 20 is deactivated, and the image projection device 30 is activated to project the information providing image IMG_P from the point of time t134 to a point of time t135. Then, the image acquisition device 20 is activated to acquire the predetermined range image IMG_R, and the image projection device 30 is deactivated from the point of time t135 to a point of time t136. Then, the image acquisition device 20 is deactivated, and the image projection device 30 is activated to project the information providing image IMG_P from the point of time t136 to a point of time t137.

Next, the vehicle driving assistance apparatus 10 proceeds with the process to a step S1210 to display the predetermined range image IMG_R on the display 41 by the displaying device 40 and display the driving assistance image IMG_G with the normal luminance level, overlapping the predetermined range image IMG_R on the display 41 by the displaying device 40.

Then, the vehicle driving assistance apparatus 10 proceeds with the process to a step S1295 to terminate executing this routine once.

As described above, also in the second modified example, the vehicle driving assistance apparatus 10 is configured to, when both of the displaying condition CD and the projecting condition CP become satisfied, display the predetermined range image IMG_R and the driving assistance image IMG_G by the displaying device 40 while decreasing the visibility of the information providing image IMG_P in the predetermined range image IMG_R.

In particular, in the second modified example, the vehicle driving assistance apparatus 10 is configured to, when both of the displaying condition CD and the projecting condition CP become satisfied, (i) acquire the predetermined range image IMG_R by the image acquisition device 20 and project the information providing image IMG_P by the image projection device 30 while differentiating the point of time to acquire the predetermined range image IMG_R by the image acquisition device 20 and the point of time to project the information providing image IMG_P by the image projection device 30 to each other, and (ii) display the predetermined range image IMG_R and the driving assistance image IMG_G by the displaying device 40.

Thereby, the information providing image IMG_P is not displayed on the display 41. Thus, the vehicle driving assistance apparatus 10 can prevent the driver from having a difficulty of recognizing the driving assistance image IMG_G.

Third Modified Example

Figure 14:
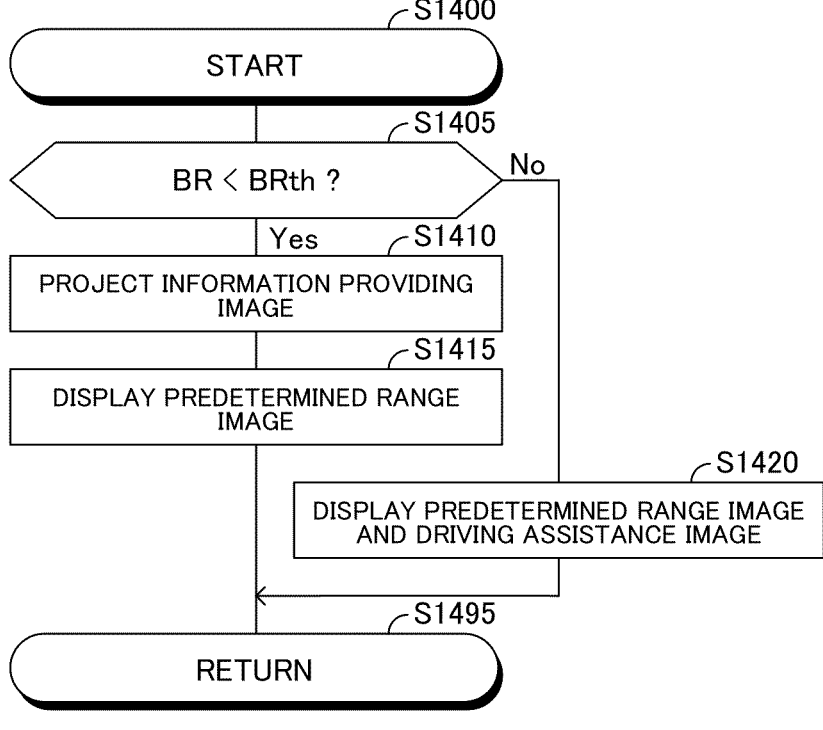
FIG. 14 is a view which shows a flowchart of a routine executed by the vehicle driving assistance apparatus according to a third modified example of the embodiment of the present invention.

Further, in a third modified example of the embodiment of the present invention, the vehicle driving assistance apparatus 10 may be configured to execute a routine shown in FIG. 14 in place of the routine shown in FIG. 6 when the vehicle driving assistance apparatus 10 proceeds with the process to the step S510 of the routine shown in FIG. 5.

In this case, when the vehicle driving assistance apparatus 10 proceeds with the process to the step S510 of the routine shown in FIG. 5, the vehicle driving assistance apparatus 10 starts to execute a process from a step S1400 of the routine shown in FIG. 14 and proceeds with the process to a step S1405 to determine whether the lighting intensity level BR is lower than a predetermined level or a predetermined lighting intensity level threshold BRth.

When the vehicle driving assistance apparatus 10 determines "Yes" at the step S1405, the vehicle driving assistance apparatus 10 proceeds with the process to a step S1410 to project the information providing image IMG_P. Next, the vehicle driving assistance apparatus 10 proceeds with the process to a step S1415 to display the predetermined range image IMG_R. Then, the vehicle driving assistance apparatus 10 proceeds with the process to a step S1495 to terminate executing this routine once.

On the other hand, when the vehicle driving assistance apparatus 10 determines "No" at the step S1405, the vehicle driving assistance apparatus 10 proceeds with the process to a step S1420 to display the predetermined range image IMG_R and the driving assistance image IMG_G. Then, the vehicle driving assistance apparatus 10 proceeds with the process to the step S1495 to terminate executing this routine once.

As described above, also in the third modified example, the vehicle driving assistance apparatus 10 is configured to, when both of the displaying condition CD and the projecting condition CP become satisfied, display the predetermined range image IMG_R and the driving assistance image IMG_G by the displaying device 40 while decreasing the visibility of the information providing image IMG_P in the predetermined range image IMG_R.

In particular, in the third modified example, the vehicle driving assistance apparatus 10 is configured to, when both of the displaying condition CD and the projecting condition CP become satisfied, (i) acquire the predetermined range image IMG_R by the image acquisition device 20 and project the information providing image IMG_P by the image projection device 30 when the lighting intensity level BR outside the own vehicle 100 is equal to or lower than the predetermined lighting intensity level threshold BRth, and display the predetermined range image IMG_R by the displaying device 40 without displaying the driving assistance image IMG_G by the displaying device 40, and when both of the displaying condition CD and the projecting condition CP become satisfied, (ii) acquire the predetermined range image IMG_R by the image acquisition device 20 without projecting the information providing image IMG_P by the image projection device 30 when the lighting intensity level BR outside the own vehicle 100 is higher than the predetermined lighting intensity level threshold BRth, and display the predetermined range image IMG_R and the driving assistance image IMG_G by the displaying device 40.

Thereby, the information providing image IMG_P is not displayed on the display 41 when the driving assistance image IMG_G is displayed on the display 41. Thus, the vehicle driving assistance apparatus 10 can prevent the driver from having a difficulty of recognizing the driving assistance image IMG_G.

It should be noted that in the third modified example, the vehicle driving assistance apparatus 10 uses the lighting intensity level BR for determining whether to project the information providing image IMG_P. In this regard, the vehicle driving assistance apparatus 10 may be configured to not use the lighting intensity level BR for determining whether to project the information providing image IMG_P.

In this case, the vehicle driving assistance apparatus 10 is configured to, when both of the displaying condition CD and the projecting condition CP become satisfied, (i) acquire the predetermined range image IMG_R by the image acquisition device 20 without projecting the information providing image IMG_P by the image projection device 30 independently of whether the lighting intensity level BR outside the own vehicle 100 is higher than the predetermined lighting intensity level threshold BRth, and (ii) display the predetermined range image IMG_R and the driving assistance image IMG_G by the displaying device 40.

Further, in the second and third modified examples of the embodiment of the present invention, the vehicle driving assistance apparatus 10 is configured to make the information providing image IMG_P unshown in the predetermined range image IMG_R. In this regard, in the present invention, means for making the information providing image IMG_P unshown in the predetermined range image IMG_R is not limited to means of the second modified example and may be other means.

Therefore, in the present invention, the vehicle driving assistance apparatus 10 may be configured to, when both of the displaying condition CD and the projecting condition CP become satisfied, (i) acquire the predetermined range image IMG_R by the image acquisition device 20 and project the information providing image IMG_P by the image projection device 30 so as to make the information providing image IMG_P unshown in the predetermined range image IMG_R, and (ii) display the predetermined range image IMG_R and the driving assistance image IMG_G by the displaying device 40.

Further, in the embodiment of the present invention and the first to third examples thereof, the vehicle driving assistance apparatus 10 is configured to decrease the visibility of the information providing image IMG_P in the predetermined range image IMG_R. In this regard, the vehicle driving assistance apparatus 10 may be configured to decrease the visibility of the driving assistance image IMG_G displayed, overlapping the predetermined range image IMG_R.

Therefore, in the present invention, the vehicle driving assistance apparatus 10 may be configured to, when both of the displaying condition CD and the projecting condition CP become satisfied, display the predetermined range image IMG_R by the displaying device 40 while decreasing the visibility of one of the driving assistance image IMG_G and the information providing image IMG_P in the predetermined range image IMG_R.

In this case, the vehicle driving assistance apparatus 10 may be configured to, when both of the displaying condition CD and the projecting condition CP become satisfied, (i) project the information providing image IMG_P by the image projection device 30 and (ii) display the driving assistance image IMG_G with the luminance level lower than the normal luminance level by the displaying device 40 without performing the luminance adjustment image processing.

That is, the vehicle driving assistance apparatus 10 may be configured to, when both of the displaying condition CD and the projecting condition CP become satisfied, (i) project the information providing image IMG_P by the image projection device 30 and (ii) display the driving assistance image IMG_G with the luminance level lower than the normal luminance level by the displaying device 40 without performing the luminance adjustment image processing so as to make a luminance level difference lower than a normal luminance level difference. In this regard, the luminance level difference corresponds to a difference between a driving assistance image luminance level and a surrounding luminance level. The driving assistance image luminance level corresponds to the luminance level of the driving assistance image IMG_G. The surrounding luminance level corresponds to the luminance level of a part of the predetermined range image IMG_R surrounding the driving assistance image IMG_G. The normal luminance level difference corresponds to a difference between the driving assistance image luminance level and the surrounding luminance level when the driving assistance image IMG_G is displayed with the normal luminance level.

As described above, the vehicle driving assistance apparatus 10 may be configured to, when both of the displaying condition CD and the projecting condition CP become satisfied, display the predetermined range image IMG_R and the driving assistance image IMG_G by the displaying device 40 while decreasing the visibility of the driving assistance image IMG_G in the predetermined range image IMG_R.

Alternatively, in the embodiment of the present invention, the vehicle driving assistance apparatus 10 may be configured to, when both of the displaying condition CD and the projecting condition CP become satisfied, (i) project the information providing image IMG_P by the image projection device 30 and (ii) display the predetermined range image IMG_R by the displaying device 40 without performing the luminance adjustment image processing and displaying the driving assistance image IMG_G by the displaying device 40.

Further, examples described above correspond to examples that the present invention is applied to the operations of the vehicle driving assistance apparatus 10 when both of (i) the displaying condition CD for displaying the predetermined range image IMG_R (i.e., an image of the predetermined range including the predetermined area AREA behind the own vehicle 100 acquired by the image acquisition device 20) and the driving assistance image IMG_G (i.e., an image for assisting the driving operation by the driver to move the own vehicle 100 rearward) by the displaying device 40 and (ii) the projecting condition CP for projecting the information providing image IMG_P (i.e., an image for providing information on the own vehicle 100 in the predetermined area AREA behind the own vehicle 100) by the image projection device 30, become satisfied.

In this regard, the present invention can be applied to the operations of the vehicle driving assistance apparatus 10 when both of (i) a displaying condition for displaying a predetermined range image (i.e., an image of a predetermined range including a predetermined area ahead of the own vehicle 100 acquired by the image acquisition device 20) and a driving assistance image (i.e., an image for assisting the driving operation by the driver to move the own vehicle 100 forward) by the displaying device 40 and (ii) a projecting condition for projecting an information providing image onto the predetermined area ahead of the own vehicle 100 by the image projection device 30, become satisfied.

What is claimed is:

1. A vehicle driving assistance apparatus, comprising:
an image acquisition device which takes and acquires an image of a predetermined range including a predetermined area around an own vehicle as a predetermined range image;

an image projection device which projects an information providing image onto the predetermined area, the information providing image corresponding to an image which indicates information on the own vehicle;

a displaying device which displays the predetermined range image and a driving assistance image, overlapping the predetermined range image for an operator of the own vehicle, the driving assistance image corresponding to an image which assists a driving operation to the own vehicle by the operator; and an electronic control unit which controls activations of the image acquisition device, the image projection device, and the displaying device, wherein the electronic control unit is configured to, when both of a displaying condition and a projecting condition become satisfied, display the predetermined range image by the displaying device while decreasing a visibility of one of the driving assistance image and the information providing image in the predetermined range image, the displaying condition corresponds to a condition for displaying the predetermined range image and the driving assistance image, and the projecting condition corresponds to a condition for projecting the information providing image, wherein the electronic control unit is configured to, when both of the displaying condition and the projecting condition become satisfied, display the predetermined range image and the driving assistance image by the displaying device while decreasing the visibility of the information providing image in the predetermined range image.

2. The vehicle driving assistance apparatus as claimed in claim 1, wherein the electronic control unit is configured to:

when both of the displaying condition and the projecting condition become satisfied, (i) acquire the predetermined range image by the image acquisition device and project the information providing image by the image projection device; and (ii) display the predetermined range image and the driving assistance image by the displaying device while decreasing the visibility of the information providing image in the predetermined range image by substituting the predetermined range image with a memorized image by an image processing device.

3. The vehicle driving assistance apparatus as claimed in claim 1, wherein the electronic control unit is configured to:

when both of the displaying condition and the projecting condition become satisfied, (i) acquire the predetermined range image by the image acquisition device and project the information providing image by the image projecting device so as to make the information providing image unshown in the predetermined range image; and (ii) display the predetermined range image and the driving assistance image by the displaying device.

4. The vehicle driving assistance apparatus as claimed in claim 1, wherein the electronic control unit is configured to:

when both of the displaying condition and the projecting condition become satisfied,

22

(i) acquire the predetermined range image by the image acquisition device and project the information providing image by the image projection device; and (ii) display the predetermined range image and the driving assistance image by the displaying device while decreasing the visibility of the information providing image in the predetermined range image by luminance adjusting the predetermined range image by an image processing device to decrease a difference between a luminance level of the information providing image shown in the predetermined range image and a luminance level of a part of the predetermined range image surrounding the information providing image.

5. The vehicle driving assistance apparatus as claimed in claim 1, wherein the electronic control unit is configured to:

memorize the predetermined range image acquired by the image acquisition device when the electronic control unit does not project the information providing image; and when both of the displaying condition and the projecting condition become satisfied, (i) acquire the predetermined range image by the image acquisition device and project the information providing image by the image projection device, and (ii) display the predetermined range image and the driving assistance image by the displaying device while decreasing the visibility of the information providing image in the predetermined range image by replacing the information providing image in the currently-acquired predetermined range image with a part of the memorized predetermined range image corresponding to the information providing image in the currently-acquired predetermined range image.

6. The vehicle driving assistance apparatus as claimed in claim 1, wherein the electronic control unit is configured to:

when both of the displaying condition and the projecting condition become satisfied, (i) acquire the predetermined range image by the image acquisition device and project the information providing image by the image projection device while differentiating a point of time to acquire the predetermined range image by the image acquisition device and a point of time to project the information providing image by the image projection device; and (ii) display the predetermined range image and the driving assistance image by the displaying device.

7. The vehicle driving assistance apparatus as claimed in claim 1, wherein the electronic control unit is configured to:

when both of the displaying condition and the projection condition become satisfied, and a lighting intensity level outside the own vehicle is equal to or lower than a predetermined lighting intensity level threshold, (i) acquire the predetermined range image by the image acquisition device and project the information providing image by the image projection device and (ii) display the predetermined range image by the displaying device without displaying the driving assistance image by the displaying device; and when both of the displaying condition and the projection condition become satisfied, and the lighting intensity level outside the own vehicle is higher than the predetermined lighting intensity level threshold, (i) acquire the predetermined range image by the image acquisition device without projecting the information providing image by the image projection device and (ii) display the predetermined range image and the driving assistance image by the displaying device.

8. A vehicle driving assistance method of projecting an information providing image onto a predetermined area around an own vehicle by the image projection device, taking an image of a predetermined range including the predetermined area to acquire a predetermined range image by an image acquisition device, and displaying the predetermined range image by a displaying device, the information providing image corresponding to an image which indicates information on the own vehicle, the displaying device being a device which displays the predetermined range image and a driving assistance image, overlapping the predetermined range image for an operator of the own vehicle, and the driving assistance image corresponding to an image which assists a driving operation to the own vehicle by the operator, wherein the vehicle driving assistance method comprises a step of displaying the predetermined range image by the displaying device while decreasing a visibility of one of the driving assistance image and the information providing image in the predetermined range image when both of a displaying condition and a projecting condition become satisfied, the displaying condition corresponds to a condition for displaying the predetermined range image and the driving assistance image, and the projecting condition corresponds to a condition for projecting the information providing image, and wherein when both of the displaying condition and the projecting condition become satisfied, displaying the predetermined range image and the driving assistance image by the displaying device while decreasing the visibility of the information providing image in the predetermined range image.

9. A computer-readable storage medium storing a vehicle driving assistance program which is configured to project an information providing image onto a predetermined area around an own vehicle by the image projection device, take an image of a predetermined range including the predetermined area to acquire a predetermined range image by an image acquisition device, and display the predetermined range image by a displaying device, the information providing image corresponding to an image which indicates information on the own vehicle, the displaying device being a device which displays the predetermined range image and a driving assistance image, overlapping the predetermined range image for an operator of the own vehicle, and the driving assistance image corresponding to an image which assists a driving operation to the own vehicle by the operator, wherein the vehicle driving assistance program is configured to display the predetermined range image by the displaying device while decreasing a visibility of one of the driving assistance image and the information providing image in the predetermined range image when both of a displaying condition and a projecting condition become satisfied, the displaying condition corresponds to a condition for displaying the predetermined range image and the driving assistance image, and the projecting condition corresponds to a condition for projecting the information providing image, and wherein the vehicle driving assistance program is configured to, when both of the displaying condition and the projecting condition become satisfied, display the predetermined range image and the driving assistance image by the displaying device while decreasing the visibility of the information providing image in the predetermined range image.

* * * * *